(12) United States Patent
Martinsson (10) Patent No.: US 11,733,990 B2
(45) Date of Patent: Aug. 22, 2023

(54) GENERATING SOFTWARE ARTIFACTS FROM A CONCEPTUAL DATA MODEL

(71) Applicant: salesforce.com, inc., San Francisco, CA (US)

(72) Inventor: Lars Martinsson, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/552,755

(22) Filed: Aug. 27, 2019

(65) Prior Publication Data

US 2021/0064355 A1    Mar. 4, 2021

(51) Int. Cl.
*G06F 8/61* (2018.01)
*G06F 16/2458* (2019.01)
*G06F 16/25* (2019.01)

(52) U.S. Cl.
CPC ............ *G06F 8/64* (2013.01); *G06F 16/2458* (2019.01); *G06F 16/256* (2019.01)

(58) Field of Classification Search
CPC ....... G06F 8/64; G06F 16/2458; G06F 16/256
USPC ......................................................... 717/114
See application file for complete search history.

(56) References Cited

U.S. PATENT DOCUMENTS

| | | | | |
|---|---|---|---|---|
| 2006/0037000 A1* | 2/2006 | Speeter | ................. | H04L 67/125 717/120 |
| 2009/0319981 A1 | 12/2009 | Akkiraju et al. | | |
| 2011/0093513 A1* | 4/2011 | Joshi | ....................... | G06F 16/25 707/804 |
| 2012/0042055 A1* | 2/2012 | Agarwala | ............. | G06F 9/5061 709/220 |
| 2013/0086130 A1* | 4/2013 | Wang | ........................ | G06F 8/60 707/812 |
| 2015/0317331 A1* | 11/2015 | Thomas | .................... | G06F 8/35 707/792 |
| 2016/0012465 A1* | 1/2016 | Sharp | ................... | G06Q 20/386 705/14.17 |

(Continued)

OTHER PUBLICATIONS

International Search Report and Written Opinion issued in counterpart International Application No. PCT/US2020/048163, dated Nov. 26, 2020 (96 pages).

(Continued)

*Primary Examiner* — Lewis A Bullock, Jr.
*Assistant Examiner* — Theodore E Hebert
(74) *Attorney, Agent, or Firm* — Sterne, Kessler, Goldstein & Fox P.L.L.C.

(57) ABSTRACT

Disclosed herein are system, method, and computer program product embodiments for generating software artifacts operable across diverse platforms from a single conceptual data model. The conceptual data model may be enhanced with metadata that allows the creation of platform-specific logical data models containing additional metadata that is leveraged to create deployable software artifacts. An organization may subsequently modify the conceptual data model and all relevant software artifacts may be updated and redeployed across all integrated platforms. Such a conceptual data model further facilitates the creation of documentation describing data entities in the organization's technical infrastructure, the creation of mapping files for use by a data exchange system, and the processing of federated queries that gather data from multiple data stores across a data landscape.

17 Claims, 5 Drawing Sheets

(56) References Cited

U.S. PATENT DOCUMENTS

| | | | | |
|---|---|---|---|---|
| 2016/0291968 | A1* | 10/2016 | Chen | G06F 16/2365 |
| 2018/0089292 | A1* | 3/2018 | Byrne | G06F 16/25 |
| 2018/0121183 | A1* | 5/2018 | Subramaniyan | G06F 9/45558 |
| 2018/0150378 | A1* | 5/2018 | Gopalswamy | G06F 8/35 |
| 2018/0165385 | A1* | 6/2018 | Gillis | G06F 8/60 |
| 2019/0052549 | A1* | 2/2019 | Duggal | G06Q 30/0635 |
| 2019/0138427 | A1* | 5/2019 | Purushothaman | G06F 11/3692 |
| 2019/0280935 | A1* | 9/2019 | Aftab | H04L 12/4641 |
| 2020/0125453 | A1* | 4/2020 | Kommera | G06F 11/1662 |
| 2020/0153699 | A1* | 5/2020 | Bai | H04L 41/145 |

OTHER PUBLICATIONS

Ferry, Nicolas et al., "CloudMF: Model-Driven Management of Multi-Cloud Applications," ACM Transactions on Internet Technology, vol. 18, No. 2, Jan. 2018 (22 pages).

* cited by examiner

GENERATING SOFTWARE ARTIFACTS FROM A CONCEPTUAL DATA MODEL

BACKGROUND

Organizations may employ data models that represent information used within the organization's technical systems. The data model serves as an abstraction that allows organizations to better manage, control, and organize data, improve and enhance communications between systems, and create better documentation. Organizations may construct and express these data models using entity-relationship diagrams, XML schemas, or other suitable constructs that define the architecture while decoupling the representation from any particular physical storage implementation or solution. These data models may serve as a valuable reference for engineers within the organization and moreover, may be deployed, harnessed, and leveraged in a variety of programmatic contexts serving varied use cases.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating software artifacts operable across diverse platforms from a single conceptual data model.

A conceptual data model may represent data used in an organization's technical landscape. Such a technical landscape may include various software applications, systems, and tools that harness, incorporate, and depend upon various types of data. The software applications may run on different platforms and be hosted in different environments, and the data used by the software applications housed in differing data stores (e.g., databases, data lakes, text files, etc.). A conceptual data model may catalogue and map data across these data sources in a centralized location. An organization may create such a conceptual data model using a suitable data modeling technique, interface, or tool, and one skilled in the relevant art(s) will appreciate that a wide-array of techniques exist generally to create data models.

An organization may house, store, and access data in, on, and/or across one or more cloud-service platforms. These platforms may offer varied functionalities and disparate storage mechanisms for housing an organization's data. Such platforms may have strengths and weaknesses compared to other platforms, and thus, different platforms may be better suited for a particular data-driven application used by an organization. Thus, an organization may employ multiple cloud-service platforms across its technical landscape. An organization may also house data and run applications on internally managed servers, e.g., in data centers, hosting facilities, in offices, etc., which may also be referred to as a platform in the below disclosure.

Platforms may accommodate varied storage mechanisms. For instance, some platforms may offer/include relational databases, graph databases, columnar databases, in-memory databases, NoSQL databases, key-value stores, data lakes, or other suitable storage mechanisms to store data. Moreover, multiple solutions, products, approaches, etc. may be offered to satisfy or provide these storage mechanisms. For example, an organization may be able to choose between particular relational databases on a particular platform.

An organization may create a conceptual data model describing applications and data across these platforms and data storage mechanisms. The abstraction provided by a conceptual data model offers several practical benefits. For example, a conceptual data model may serve as a reference for engineers within an organization. Organizations may also employ a conceptual data model, once developed, in a variety of programmatic contexts and use cases. For example, an organization may create, deploy, and maintain physical entities (e.g., actual tables, files, etc.), logical data models, and physical data models using the conceptual data model. An organization may create software artifacts, e.g., data definition language (DDL) scripts and data manipulation language (DML) scripts, to instantiate, create, and maintain these entities across the data landscape.

However, when an organization leverages multiple platforms, each platform may have unique requirements and protocols that the software artifacts must adhere to. The organization may need to develop a massive amount of software artifacts to cover every integrated platform and every storage mechanism used in those platforms. Moreover, when the conceptual data model changes in any fashion, which may happen frequently (e.g., during a software update that adds a new field), the organization may have to manually modify and update existing software artifacts and redeploy all of the software artifacts across every platform. For organizations using many platforms and storage mechanisms, the creation and maintenance of software artifacts may be extremely burdensome. No legacy data modeling technique or system provides a solution to ease this burden.

Accordingly, a need exists to harness a single conceptual data model that spurs the generation of multiple logical data models across diverse platforms to facilitate the creation of software artifacts operable across all integrated platforms and data stores. By generating the full gamut of software artifacts needed to instantiate and maintain a data landscape across all integrated platforms from a single conceptual data model, organizations may better manage their data landscape from a centralized location, automate the release software updates to integrated software applications, and ultimately save time, money, and resources.

Figure 1:
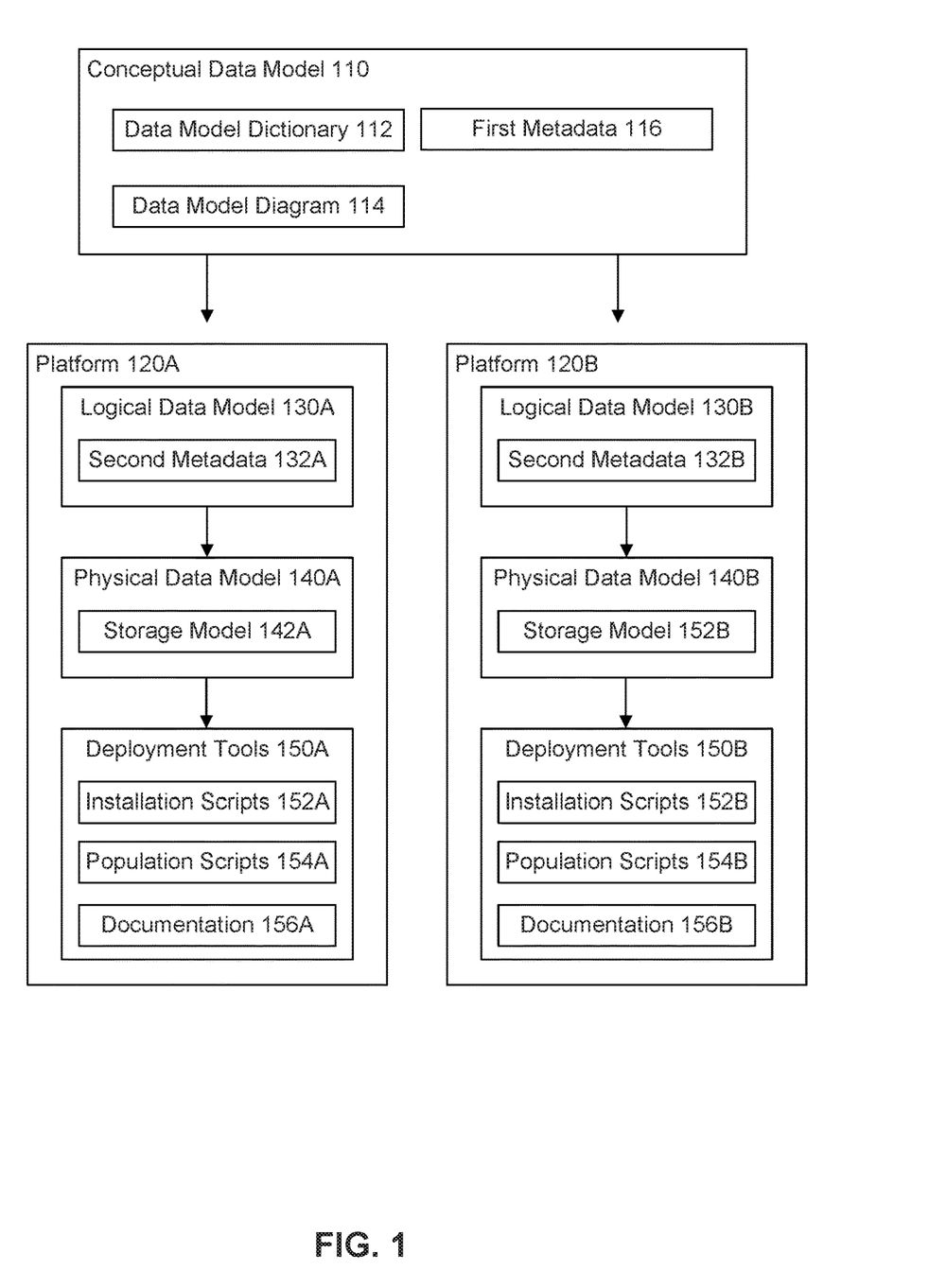
FIG. 1 is a block diagram of an environment including a conceptual data model, according to some embodiments.

FIG. 1 is a block diagram of environment 100 including a conceptual data model, according to some embodiments. Any operation herein may be performed by any type of structure in the diagram, such as a module or dedicated device, in hardware, software, or any combination thereof. Environment 100 may include conceptual data model 110, data model dictionary 112, data model diagram 114, first metadata 116, platforms 120, logical data models 130, second metadata 132, physical data models 140, deployment tools 150, installation scripts 152, population scripts 154, and documentation 156.

Conceptual data model 110 may be a data model depicting a data landscape. Conceptual data model 110 may represent data used by software applications or otherwise stored across platforms employed by an organization. Conceptual data model 110 may represent the organization's data without reference to physical devices, architectural specifics, implementation details, storage particularities, etc. and is thus a logical representation of the data entities. An organization may create conceptual data model 110 using any suitable data modeling technique or tool, e.g., an XML document, modeling language, or suitable design tool. Conceptual data model 110 may facilitate the creation of software artifacts, e.g., installation scripts 152, population scripts 154, and documentation 156, across platforms 120 and different storage mechanisms offered therein. By maintaining only conceptual data model 110, an organization may avoid maintaining a logical data model unique to each platform, physical data models unique to each storage mechanism integrated within the organization's technical landscape, and, as described in further detail below, software artifacts to manage the data landscape. Conceptual data model 110 may include data model dictionary 112, data model diagram 114, and first metadata 116.

Data model dictionary 112 may be a textual or other suitable syntactic description of data entities existing within an organization's technical systems. Such entities may include database tables, documents, files, data lakes, etc. Data model dictionary 112 may include entity names, data types, field width or size, ordering, relationships between the entities, and other suitable information describing the physical attributes of a data entity or element. In some embodiments, data model dictionary 112 may be an ASCII text file, an XML file, or other suitable textual definition file. Data model dictionary 112 may be created and maintained using a suitable data modeling tool, composer, toolkit, etc. In an embodiment, data model dictionary 112 may be derived from information in an entity-relationship diagram (ERD) or other visual representation or through other suitable advanced data modeling techniques.

Data model diagram 114 may be an ERD or other graphical representation of data used in an organization's technical systems. Data model diagram 114 may compliment or supplement data model dictionary 112 or provide redundant information in a graphical form. Thus, data model diagram 114 may provide an alternative mechanism by which to specify entities and relationships between the entities across the data landscape. Data model diagram 114 may specify relationships between entities using arrows, lines, or other suitable indicator. For example, in a relational database system, the relationship between entities may be a reference constraint between a field in one database table and a field in a second database table, and data model diagram 114 may display these tables as boxes, the fields within the table as boxes within the boxes, and connect these boxes with a line or arrow to indicate the relationship. In an embodiment, data model diagram 114 may be derived from the information in data model dictionary 112. However, in other embodiments, the reverse may be true, and data model dictionary 112 may be derived from data model diagram 114.

First metadata 116 may be information incorporated, included, or added in conceptual data model 110. First metadata 116 may describe techniques for deploying entities across platforms 120. First metadata 116 may contain information about storage mechanisms and data stores available on platforms 120. For example, first metadata 116 may include information about various platforms' particular access requirements and protocols. For example, authentication protocols may differ between a first platform and a second platform, and first metadata 116 may reflect these differences and include information about how to adhere to each of the protocols. Additional details about particular storage mechanisms available in each platform may be included in first metadata 116. For example, different relational database systems may have different indexing requirements and capabilities, e.g., a particular relational database system may offer different indexing capabilities than a second relational database system, and the syntactic requirements for instantiating, changing, deleting or refreshing an index may differ between products. Thus, to perform certain behaviors, syntactical requirements across storage mechanisms may differ and an indication of the appropriate protocols may be included in first metadata 116. For example, first metadata 116 may describe partitioning requirements unique to a platform in platforms 120 or a data storage mechanism employed therein. First metadata 116 thus enables the auto-creation of logical data models representing conceptual model 110 across each platform in platforms 120 (as described below). These logical data models in turn facilitate the creation of software artifacts operable across every integrated platform.

Platforms 120, such as platform 120A and platform 120B, may be one or more cloud-service platforms or other suitable hosting architecture, infrastructure, or system. Platform 120A may differ from platform 120B in a variety of respects and may offer different services, functionalities, data stores, etc. For example, some platforms 120 may offer storage mechanisms, e.g., relational databases, graph databases, columnar databases, in-memory databases, NoSQL databases, key-value stores, data lakes, or other suitable storage mechanisms. Multiple approaches (i.e., particular products or services) may be offered among these individual storage mechanisms, for example, a platform may offer more than one data-lake solution. In an embodiment, platforms 120 may also be internally managed web servers, databases, and other web components or other internally managed resources outside of the context of a vendor-managed cloud-service platform.

Logical data models 130, such as logical data model 130A and logical data model 130B, may be data models depicting a platform-specific data landscape. Logical data models 130 may represent entities, relationships between the entities, entity types, identifiers, and other suitable entity characteristics. While specific to a particular platform in an organization's technical landscape, logical data models 130 may be decoupled from particular physical storage mechanisms, products, approaches, or architectures and associated operational and deployment details. Thus, logical data models may represent the organization's data architecture using storage- and implementation-independent means. Logical data models 130 may be derived from conceptual data model 110 for each of platforms 120. Logical data models 130 may provide the capability to derive platform-specific and storage-specific software artifacts via second metadata 132, described in further detail below.

Second metadata 132 may be information incorporated, included, or added in logical data models 130 describing techniques for deploying entities on a platform and onto a particular data storage mechanism within platforms 120. Second metadata 132 may describe data stores employed by an organization with a platform among platforms 120. Second metadata 132 may list the scope of data stores employed on that platform used to determine a number of software artifacts to be generated, as described in further detail below. Second metadata 132 may further indicate particularized requirements or protocols mandated by a data storage mechanism within a platform among platforms 120. For example, a first platform housing a relational database may require particularized syntax for the creation of a table in the relational database, and this may differ from the particularized syntax for the creation of a table in a second type of relational database on the platform. Second metadata 132 stores the information needed to create software artifacts readily deployable in a particular platform and storage mechanism, as described in further detail below.

Physical data models 140 may be a storage-mechanism-specific model that represents objects in a particular data storage system on a particular platform. For instance, physical data models 140 may represent tables, columns, primary keys, and foreign keys in a relational database. However, physical data models 140 may reflect other data storage systems such as graph databases, columnar databases, in-memory databases, NoSQL databases, key-value stores, data lakes, etc. Moreover, multiple solutions may be offered among these varied storage mechanisms. Additionally, physical data models 140 may be tailored to a particular product among these varied storage mechanisms. For example, physical data models 140 representing relational data objects in a first type of relational database may appear different than physical data models 140 representing relational data objects in a second type of relational database. Physical data models 140 may be harnessed to generate various software artifacts such as installation scripts 152A and population scripts 154A.

Deployment tools 150 may be software artifacts that instantiate, deploy, and maintain entities (e.g., tables, files, documents, structures, etc.) across data stores on platforms 120. Deployment tools 150 may be DDL scripts, DML scripts, developer documentation, mapping files, and other suitable programmatic constructs that can create and update the physical entities across platforms 120. Deployment tools 150 may include installation scripts 152A, population scripts 154A, documentation 156, and other suitable constructs. Deployment tools 150 may be harnessed by deployment agent 210, described in further detail below, to initialize the entities across platforms 120 and to modify software artifacts and update the entities upon a change to conceptual data model 110.

Installation scripts 152 may be database initialization scripts provided in DDL or other suitable syntax capable of defining data structures. Initialization scripts 152 may be used to deploy, initialize, rollout, or otherwise implement physical elements related to conceptual data model 110. Installation scripts 152 may vary based on the target storage mechanism, i.e., a graph database script may differ substantially from a key-value store script. For example, initialization scripts 232 may be built automatically to implement Sales Order, Account, and Locale tables on a customer-relationship-management (CRM) platform through the creation of DDL syntax, e.g., "CREATE TABLE," "ALTER TABLE", etc. Platforms 120 may require unique protocols and syntax as captured in first metadata 116 and second metadata 132, and the created installation scripts 152 may adhere to these requirements. Installation scripts 152 may further include scripts in DML or other suitable syntax capable of accessing, modifying, and retrieving data from existing data structures. For example, installation scripts 152 may be built automatically to make changes to the previously deployed Sales Order, Account, and Locale tables through the creation and execution of DML syntax, e.g., "UPDATE," "INSERT INTO TABLE", etc.

Population scripts 154 may be text files, documents, scripts, and other suitable tools that are created to add data that is nominal, dummy, contrived, test, etc. to entities created using installation scripts 152. In one example, population scripts 154 may include rows of information to be processed by a script in installation scripts 152 to auto-populate relational database tables with information. For example, an entity may exist in conceptual data model 110 describing a "Customer" table containing numerous columns/fields describing the customer, e.g., "Name," "Address," "Phone Number," etc. In such an example, population scripts 154 may contain a row of "XXXXX" "55 Maple Ave.", "555-555-5555", etc. which may be used to add a row to the table via an "INSERT" table. Such a need may be enhanced where the storage mechanism is not a relational database table, e.g., where the storage mechanism is a graph database and the actual entity is not created in any sense until the data is populated. Population scripts 154 may be created by employing a heuristic method with knowledge about the entities, e.g., the entity name, described in conceptual data model 110. In the above "Customer" table example, first metadata 116 may contain additional descriptors of the characteristics of the entity known to data modeling tool 202.

Documentation 156 may provide descriptions about entities defined in conceptual data model 110. Documentation 156 may take any suitable readable format, e.g., HTML, text, word documents, or other suitable human-readable. In an embodiment, documentation 156 may include images, tables, graphs, ERDs, and other non-textual information to enhance the readability of the information. Documentation 156 may be automatically generated for each platform in platforms 120 based on conceptual data model 110, i.e., the documentation may differ between platforms 120. Documentation 156 may be provided to documentation interface 206, which may serve the information to developers and other users inside or outside of an organization, e.g., using HTTP or other web infrastructure.

Figure 2:
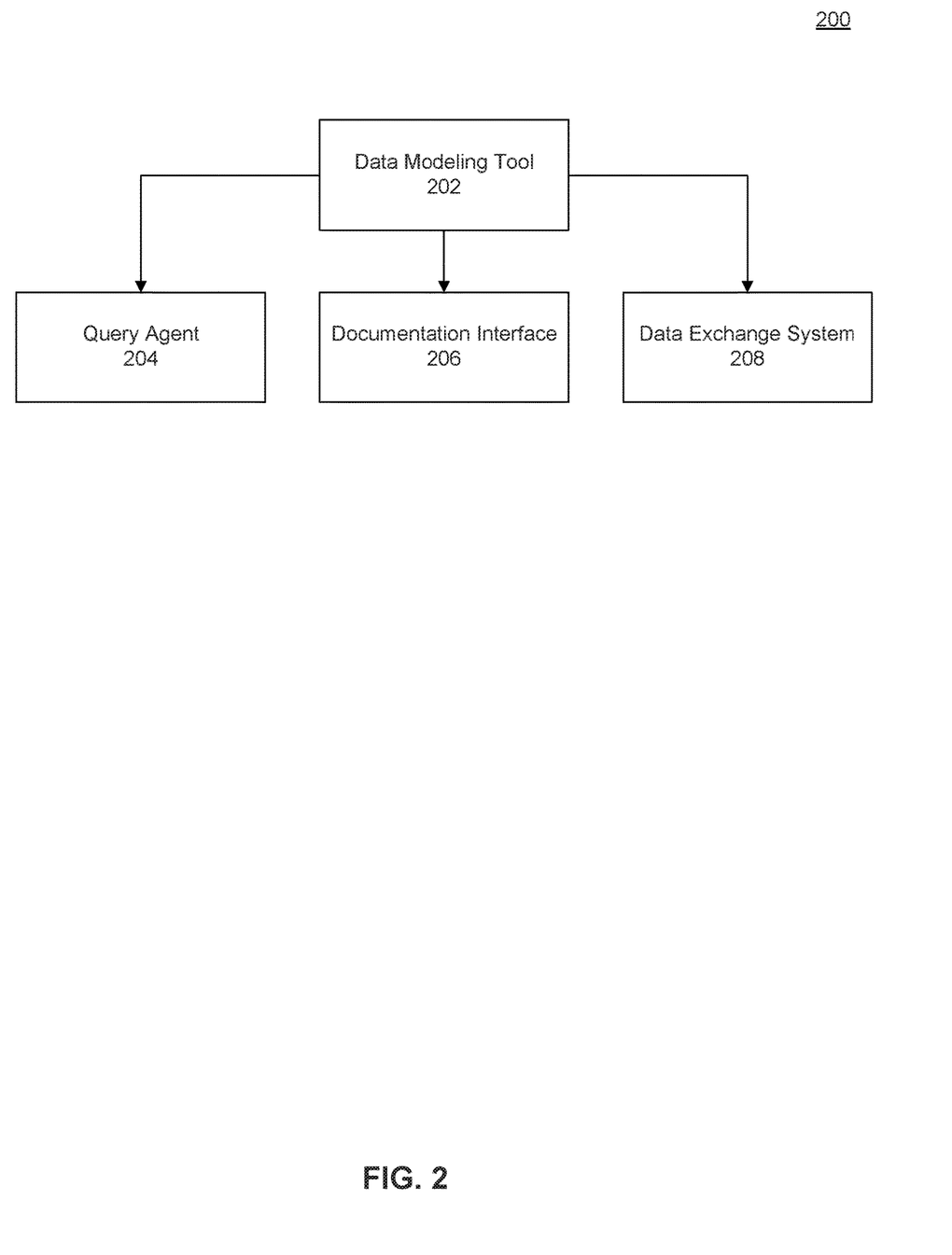
FIG. 2 is a block diagram of an architecture including a data modeling tool, according to some embodiments.

FIG. 2 is a block diagram of architecture 200 including a data modeling tool, according to some embodiments. Any operation herein may be performed by any type of structure in the diagram, such as a module or dedicated device, in hardware, software, or any combination thereof. Architecture 200 may include data modeling tool 202, query agent 204, documentation interface 206, data exchange system 208, and deployment agent 210.

Data modeling tool 202 may be used by a representative of an organization to create conceptual data model 110 and/or to include first metadata 116 in conceptual data model 110 and/or second metadata 132 in logical data models 130. Data modeling tool 202 may allow an administrator to identify platforms 120 used throughout the organization's data landscape and data storage mechanisms employed by those platforms. After pre-selecting platforms 120 and the data storage mechanisms, data modeling tool 202 may allow a user to tailor conceptual data model 110 towards these platforms and storage mechanisms. Data modeling tool 202 may interact with platforms 120 via an appropriate application programming interface (API) to attain appropriate information about the storage mechanisms employed by platforms 120 when compiling first metadata 116 and/or second metadata 132. Data modeling tool 202 may further interact with query agent 204, documentation interface 206, data exchange system 208, and deployment agent 210 to derive additional functionalities using conceptual data model 110, as described in further detail below.

Query agent 204 may interact with data modeling tool 202 to process federated queries run against multiple data sources in an organization's data architecture. A federated query may be a query, e.g., using SQL or other querying language, that gathers data from across multiple platforms 120 in a data landscape. Query agent 204 may use conceptual data model 110 to process a federated query received from an administrator, developer, or other user at an organization. In an embodiment, query agent 204 may provide an interface to users to enter a query and/or browse the data landscape indicated in conceptual data model 110. In an embodiment, data modeling tool 202 may expose conceptual data model 110 to query agent 204 in a suitable manner, and query agent 204 may process federated queries based on the information contained therein. In another embodiment, data modeling tool 202 may provide a querying interface and receive the query from the user of data modeling tool 202. In this embodiment, data modeling tool 202 may then engage query agent 204 to process the received query, access the various storage mechanisms through appropriate protocols, and return appropriate data records. In this embodiment, data modeling tool 202 may display the results of the federated query for a user.

Documentation interface 206 may provide developer documentation, such as documentation 156, in the form of HTML pages, help manuals, text, documents, etc. to members of the organization and other users. Documentation interface 206 may receive documentation 156 automatically created by data modeling tool 202 based on created logical data models 130 and second metadata 132 contained therein. Documentation interface 206 may provide documentation 156 to interested parties using web servers, HTTP, or other appropriate web technologies. In an embodiment, documentation interface 206 may impose access restrictions in the form of security requirements, e.g., by requiring a login and password to limit the access to documentation 156 to authorized individuals and groups. In an embodiment, documentation interface 206 may receive conceptual data model 110 from data modeling tool 202, store documentation 156, and provide documentation 156 via a suitable web interface. In another embodiment, data modeling tool 202 may engage documentation interface 206 to provide documentation 156 to users within data modeling tool 202.

Data exchange system 208 may process mapping files created by data modeling tool 202. Such mapping files may facilitate data transformation and loading between and among data stores across platforms 120. Data exchange system 208 may cause the transfer of data from a platform in platforms 120, i.e., the source schema, into a second platform in platforms 120, i.e., the target schema. Data exchange system 208 thus allows an organization to streamline extract, transform, and load (ETL) functions based on the information in conceptual data model 110. In an embodiment, a user may perform ETL transactions within data modeling tool 202, i.e., data modeling tool 202 may engage data exchange system 208 to perform the ETL transactions from within the interface provided by data modeling tool 202.

Deployment agent 210 may deploy entities into a physical environment using software artifacts such as deployment tools 150 created by data modeling tool 202. In an embodiment, deployment agent 210 may operate within or at the bequest of data modeling tool 202. In such an embodiment, a user may design conceptual data model 110 within data modeling tool 202, imbue conceptual data model 110 with first metadata 116 and second metadata 132. Deployment agent 210 may receive updated software artifacts based on a change made to conceptual data model 110 in data modeling tool 202, and deployment agent 210 may update the entities in the physical environments using the updated software artifacts.

Figure 3:
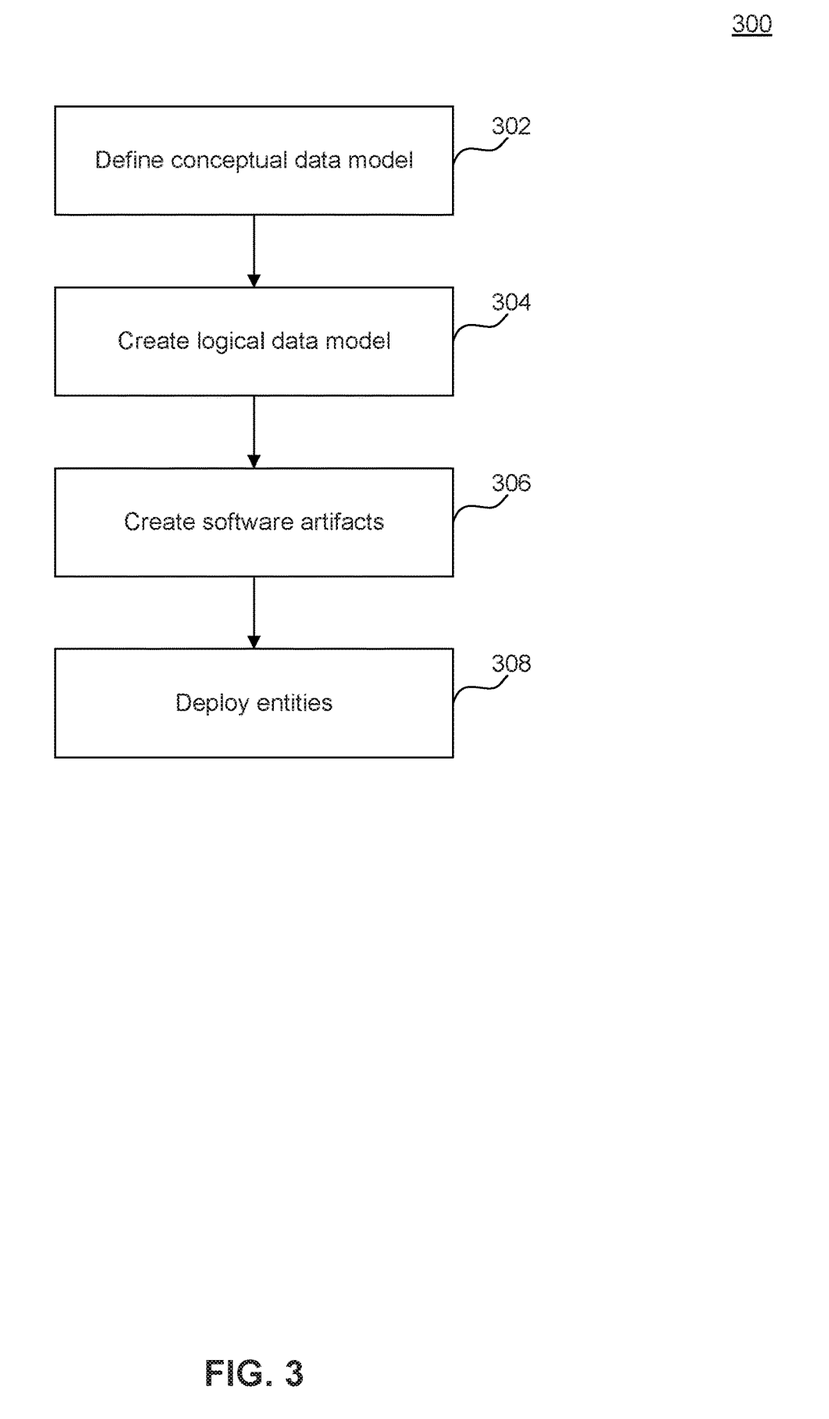
FIG. 3 is a flowchart illustrating a method of creating software artifacts based on a conceptual data model, according to some embodiments.

FIG. 3 is a flowchart illustrating method 300 of creating software artifacts based on a conceptual data model. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, data modeling tool 202 may create or otherwise facilitate the creation of conceptual data model 110 by an administrator, data architect, or other user. In an embodiment, data modeling tool 202 may allow the user to import an externally created data model and derive conceptual data model 110 from the received data model, e.g., receive data model dictionary 112, data model diagram 114, and/or other suitable descriptors of conceptual data model 110 created in external tools and uploaded to data modeling tool 202. When storing conceptual data model 110, data modeling tool 202 may include or incorporate first metadata 116 within conceptual data model 110 based on stored logic about platforms 120 and storage mechanisms therein. In an embodiment, data modeling tool 202 may allow a user to select a platform or platforms from platforms 120 and update conceptual data model 110 based on the selected platforms. Data modeling tool 202 may add first metadata 116 that includes deployment information specific to each platform in platforms 120. First metadata 116 may include authentication protocol information specific to platforms 120 and/or other information specifying the nature of interactions to occur between data modeling tool 202 and platforms 120, e.g., parameters needed to execute software artifacts on or within the platform. First metadata 116 may further include storage-solution specific information based on internally retrieved logic. For example, relational databases used across platforms may differ (e.g. SQL SERVER, ORACLE, MYSQL), and first metadata 116 may include information specific to a particular storage solution on a particular platform among platforms 120.

In 304, data modeling tool 202 may create logical data models 130 based on conceptual data model 110 and first metadata 116 contained therein. Data modeling tool 202 may create logical data models 130 for each platform in platforms 120 employed within an organization's data landscape. Data modeling tool 202 may also add second metadata 132 to the created logical data models 130. Second metadata 132 may include implementation details specific to the platform to which the logical data model corresponds. Second metadata 132 may subsequently allow data modeling tool 202 to create deployment tools 150 by incorporating known information about the protocols adhered to by each platform among platforms 120 as well as the protocols, rules, etc. for physical storage models and mechanisms provided by the platform. For example, one exemplary data landscape may include database instances running on two different platforms. In this embodiment, data modeling tool 202 may create two logical data models 130, one for each of the platforms. The created logical data models 130 may remain storage solution independent, i.e., the logical data models 130 may not indicate the exact storage mechanism (e.g, SQL SERVER, ORACLE, etc.), but may define the entities and their relationships in a logical fashion. However, the created logical data models 130 may include specific information in second metadata 132 required by that specific platform among platforms 120 and specific to the storage mechanisms provided within those platforms 120.

In 306, data modeling tool 202 may create software artifacts operable across platforms 120 based on logical data models 130, first metadata 116, and second metadata 132. The software artifacts may include installation scripts 152, population scripts 154, documentation 156, and other suitable deployment tools 150, as will be understood by one skilled in the relevant art(s). Data modeling tool 202 may store created software artifacts in a suitable structure, file system, disk, memory, etc. In an embodiment, data modeling tool 202 may allow a user to view the created software artifacts and edit or manipulate the created software artifacts in additional fashions prior to deploying entities via the software artifacts. To continue the above example of an application deployment spanning multiple platforms and consisting of relational database technologies, data modeling tool 202 may examine logical data models 130 created for each platform specified in conceptual data model 110. For each logical data model in logical data models 130, data modeling tool 202 may generate appropriate DDL scripts to create the tables, rows, columns, indexes, disk partitions, and other components as specified in conceptual data model 110. Because a first platform in the example may have different requirements for executing a DDL script or different syntactic requirements for creating the actual DDL script than a second platform, the DDL scripts may differ. Data modeling tool 202 may adapt to these differences using on first metadata 116. Additionally, conceptual data model 110 may specify differing storage mechanisms within the multiple platforms. Thus, the first DDL script and the second DDL script may further differ based on the underlying storage mechanism. Data modeling tool 202 may accommodate these differences using the information provided by second metadata 132. In addition to DDL scripts to instantiate the relational database tables, data modeling tool 202 may create DML scripts that specify appropriate "UPDATE" or "INSERT" statements to populate the created tables. To appropriately harness these DML scripts, data modeling tool 202 may also create population scripts 154 to feed the DML scripts to incorporate nominal data in the tables. Especially in the context of graph database, the inclusion of dummy data via population scripts 154 is necessary to create the entities. The above example is merely exemplary, however, and one skilled in the arts will appreciate that many more than two platforms may be incorporated within a data landscape as well as a wide-array of storage mechanisms beyond relational databases.

In 308, data modeling tool 202 may employ deployment agent 210 to instantiate physical entities across platforms 120 and across the various storage systems therein using the software artifacts generated in 306. In an embodiment, data modeling tool 202 may receive a command to initialize the entities across platforms 120 or on a particular platform among platforms 120 from a user of data modeling tool 202. In one embodiment, deployment agent 210 may instantiate the entities by interacting with appropriate APIs or other interfaces provided by platforms 120. For example, a service provided by a particular platform in the above example may allow an organization to run a query or other SQL command against a back-end database. The requirements and nature of this service may differ between platforms, as captured by first metadata 116 and second metadata 132. Deployment agent 120 may engage the service using stored parameters and run the software artifacts, in this example, DDL and DML scripts, against the backend-databases and return appropriate results or confirmations in response to the command to create the entities. In another embodiment, data modeling tool 202 may provide downloadable versions of the software artifacts to an administrator or user in an exportable fashion. In this embodiment, a user may then execute the software artifacts using tools available on and native to platforms 120 and storage facilities therein. For example, the user could receive a DDL script and copy/paste the script into a querying tool provided by a platform among platforms 120.

Figure 4:
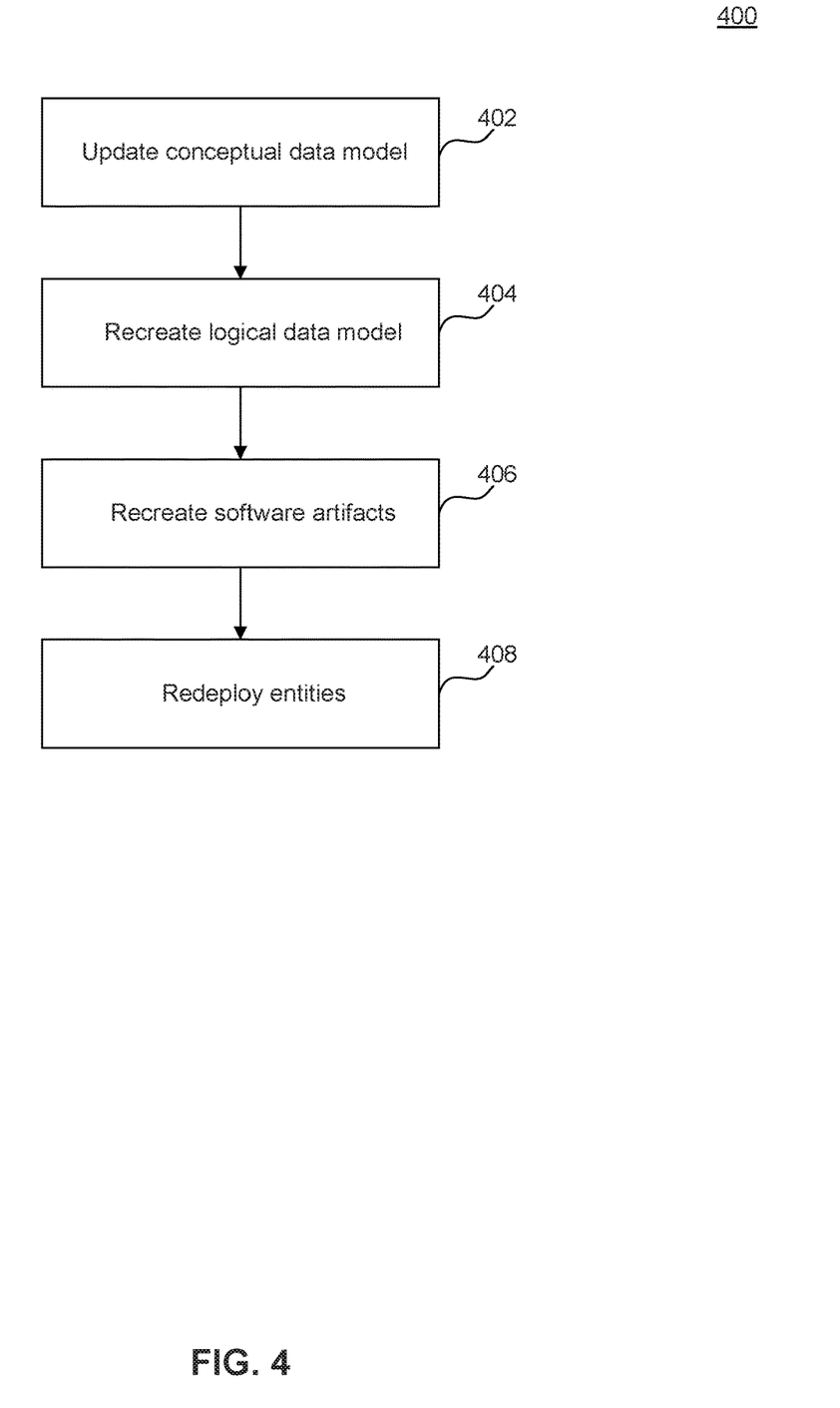
FIG. 4 is a flowchart illustrating a method of generating developer documentation based on a conceptual data model, according to some embodiments.

FIG. 4 is a flowchart illustrating method 400 of generating developer documentation based on a conceptual data model, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, data modeling tool 202 may update or facilitate the updating of conceptual data model 110 by an administrator, data architect, or other user. In an embodiment, data modeling tool 202 may allow such a user to import an externally created data model and determine changes to a previously created version of conceptual data model 110 from the imported data model. Data modeling tool 202 may complete any needed updates to first metadata 116 within conceptual data model 110 based on the changes. For example, a user may include an additional application running on a new platform among platforms 120 in an updated version of conceptual data model 110. In this example, data modeling tool 202 may update first metadata 116 to accommodate the new software application, the entities used therein, and the new platform not previously included in the data landscape.

In 404, data modeling tool 202 may recreate logical data models 130 based on the changed conceptual data model 110 and first metadata 116 contained therein, as updated in 402. Data modeling tool 202 may complete needed updates to logical data models 130 across each platform in platforms 120. Data modeling tool 202 may also update second metadata 132 based on any changes made to conceptual data model 110. To continue the above example, second metadata 132 may be updated to include storage-location specific information to accommodate the new application and data stored and used by the application.

In 406, data modeling tool 202 may recreate any software artifacts impacted by the changes to conceptual data model 110. Data modeling tool 202 may update installation scripts 152, population scripts 154, documentation 156, and other suitable deployment tools 150, as will be understood by one skilled in the relevant art(s). To continue the above example, the new application, platform, and data entities may mandate the creation of new DDL and DML scripts to instantiate the entities serving the new application. In another example, a change may have been received in 402 to add a column to a table in a relational database system. In this example, the previously created software artifacts may be modified to include the change or a new set of scripts may be created to instantiate the delta between the original conceptual data model and the updated conceptual data model.

In 408, data modeling tool 202 may employ deployment agent 210 to update the physical entities across platforms 120 and across the various storage systems therein using the software artifacts updated in 406. For example, deployment agent 120 may engage a service provided by a particular platform to run the software artifacts against the data storage mechanisms in the platform. Deployment agent 120 may receive appropriate results or confirmations in response to the updates. In another embodiment, data modeling tool 202 may provide downloaded and exportable versions of the updated software artifacts. In this embodiment, the user may then execute the using tools available on and native to platforms 120 and storage facilities therein.

In this fashion, a change to conceptual data model 110 may be propagated down to all software artifacts derived from conceptual data model 110. Thus, an organization may make document or note a change to its technical landscape in a single, centralized location, i.e., conceptual data model 110. In this example, the organization need not update or maintain all software artifacts across all platforms, storage mechanisms, and applications to accommodate the change in all locations.

Figure 5:
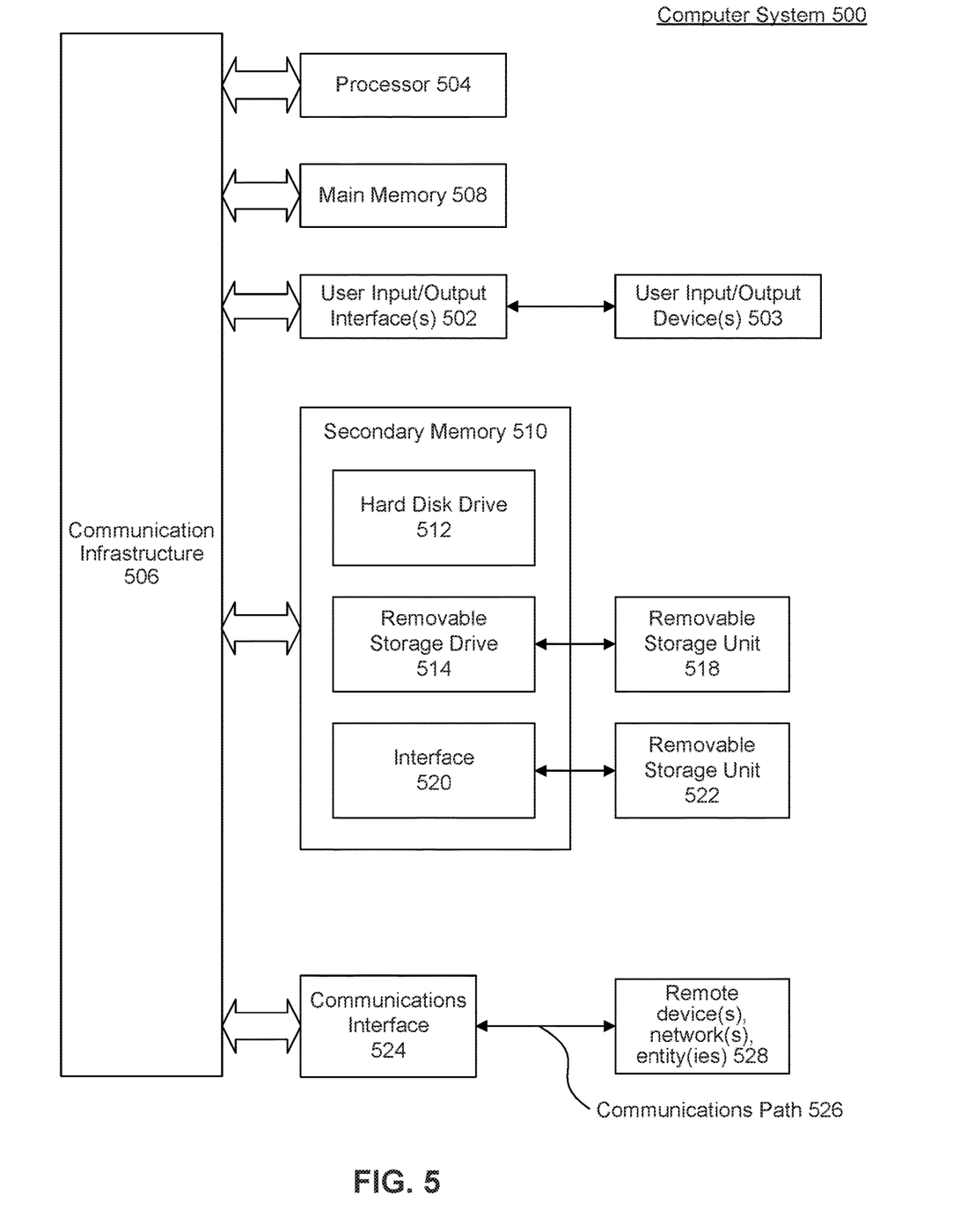
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving, by one or more processors, a conceptual data model that depicts a data landscape comprising an entity and a plurality of platforms;
adding, to the conceptual data model, first metadata comprising platform-specific access requirements for authenticating with each platform in the plurality of platforms and syntactical requirements to create a table and an index on each storage mechanism available in each platform, wherein the platform-specific access requirements indicate authentication protocol information comprising a parameter needed to execute software artifacts in each platform in the plurality of platforms;
automatically creating, by the one or more processors, for each platform in the plurality of platforms, a logical data model comprising second metadata that specifies a particularized syntax to create the entity on each storage mechanism available in each platform using the first metadata;
deriving randomized data based on the first metadata and an entity type corresponding to the entity;
generating, by the one or more processors, for each platform in the plurality of platforms, platform-specific installation scripts and platform-specific data population scripts for each storage mechanism available in each platform based on the second metadata, wherein the platform-specific installation scripts create the entity as one or more data structures in a database and an index on the one or more data structures using the particularized syntax in the second metadata, and wherein the platform-specific data population scripts populate the one or more data structures with the randomized data; and
deploying, by the one or more processors, the one or more data structures into each platform in the plurality of platforms by engaging a service offered by each platform using the platform-specific access requirements and the parameter to execute the platform-specific installation scripts and the platform-specific data population scripts.

2. The method of claim 1, further comprising:
receiving, by the one or more processors, a change to the conceptual data model;
creating, by the one or more processors, updated installation scripts and updated data population scripts for each platform in the plurality of platforms based on the change and the conceptual data model; and
redeploying, by the one or more processors, the one or more data structures into each platform in the plurality of platforms using the updated installation scripts and the updated data population scripts.

3. The method of claim 1, further comprising:
determining, by the one or more processors, an entity type corresponding to the entity; and
creating, by the one or more processors, documentation based on the first metadata and the entity type, wherein the documentation describes the entity and the entity type.

4. The method of claim 1, further comprising:
creating, by the one or more processors, a mapping file based on the conceptual data model.

5. The method of claim 1, further comprising:
exposing, by the one or more processors, the conceptual data model to a query agent to process a federated query.

6. The method of claim 1, wherein the conceptual data model further comprises a second entity and a relationship between the entity and the second entity.

7. A system, comprising:
a memory; and
a processor coupled to the memory and configured to:
receive a conceptual data model that depicts a data landscape comprising an entity and a plurality of platforms;
add, to the conceptual data model, first metadata comprising platform-specific access requirements for authenticating with each platform in the plurality of platforms and syntactical requirements to create a table and an index on each storage mechanism available in each platform, wherein the platform-specific access requirements indicate authentication protocol information comprising a parameter needed to execute software artifacts in each platform in the plurality of platforms;
automatically create for each platform in the plurality of platforms, a logical data model comprising second metadata that specifies a particularized syntax to create the entity on each storage mechanism available in each platform using the first metadata;
derive randomized data based on the first metadata and an entity type corresponding to the entity;
generate for each platform in the plurality of platforms, platform-specific installation scripts and platform-specific data population scripts for each storage mechanism available in each platform based on the second metadata, wherein the platform-specific installation scripts create the entity as one or more data structures in a database and an index on the one or more data structures using the particularized syntax in the second metadata, and wherein the platform-specific data population scripts populate the one or more data structures with the randomized data; and
deploy the one or more data structures into each platform in the plurality of platforms by engaging a service offered by each platform using the platform-specific access requirements and the parameter to execute the platform specific installation scripts and the platform-specific data population scripts.

8. The system of claim 7, the processor further configured to:
receive a change to the conceptual data model;
create updated installation scripts and updated data population scripts for each platform in the plurality of platforms based on the change and the conceptual data model; and
redeploy the one or more data structures into each platform in the plurality of platforms using the updated installation scripts and the updated data population scripts.

9. The system of claim 7, the processor further configured to:
determine an entity type corresponding to the entity; and
create documentation based on the first metadata and the entity type, wherein the documentation describes the entity and the entity type.

10. The system of claim 7, the processor further configured to:
create a mapping file based on the conceptual data model.

11. The system of claim 7, the processor further configured to:
expose the conceptual data model to a query agent to process a federated query.

12. The system of claim 7, wherein the conceptual data model further comprises a second entity and a relationship between the entity and the second entity.

13. A non-transitory computer-readable device having instructions stored thereon that, when executed by a computing device, cause the computing device to perform operations comprising:
receiving a conceptual data model that depicts a data landscape comprising an entity and a plurality of platforms;
adding, to the conceptual data model, first metadata comprising platform-specific access requirements for authenticating with each platform in the plurality of platforms and syntactical requirements to create a table and an index on each storage mechanism available in each platform, wherein the platform-specific access requirements indicate authentication protocol information comprising a parameter needed to execute software artifacts in each platform in the plurality of platforms;
automatically creating for each platform in the plurality of platforms, a logical data model comprising second metadata that specifies a particularized syntax to create the entity on each storage mechanism available in each platform using the first metadata;
deriving randomized data based on the first metadata and an entity type corresponding to the entity;
generating for each platform in the plurality of platforms, platform-specific installation scripts and platform-specific data population scripts for each storage mechanism available in each platform based on the second metadata, wherein the platform-specific installation scripts create the entity as one or more data structures in a database and an index on the one or more data structures using the particularized syntax in the second metadata, and wherein the platform-specific data population scripts populate the one or more data structures with the randomized data; and
deploying the one or more data structures into each platform in the plurality of platforms by engaging a service offered by each platform using the platform-specific access requirements and the parameter to execute the platform-specific installation scripts and the platform-specific data population scripts.

14. The non-transitory computer-readable device of claim 13, the operations further comprising:
receiving a change to the conceptual data model;
creating updated installation scripts and updated data population scripts for each platform in the plurality of platforms based on the change and the conceptual data model; and
redeploying the one or more data structures into each platform in the plurality of platforms using the updated installation scripts and the updated data population scripts.

15. The non-transitory computer-readable device of claim 13, the operations further comprising:
determining an entity type corresponding to the entity; and
creating documentation based on the first metadata and the entity type, wherein the documentation describes the entity and the entity type.

16. The non-transitory computer-readable device of claim 13, the operations further comprising:
  creating a mapping file based on the conceptual data model.

17. The non-transitory computer-readable device of claim 13, the operations further comprising:
  exposing the conceptual data model to a query agent to process a federated query.

* * * * *